(12) United States Patent
Hoyle et al.

(10) Patent No.: US 6,450,254 B1
(45) Date of Patent: Sep. 17, 2002

(54) FLUID CONTROL SYSTEM WITH AUTONOMOUSLY CONTROLLED VALVES

(75) Inventors: Scott Baxter Hoyle, Maple Shade; Michael Anthony McSweeney, Spotswood, both of NJ (US)

(73) Assignee: Lockheed Martin Corp., Moorestown, NJ (US)

( * ) Notice: Subject to any disclaimer, the term of this patent is extended or adjusted under 35 U.S.C. 154(b) by 0 days.

(21) Appl. No.: 09/608,829

(22) Filed: Jun. 30, 2000

(51) Int. Cl.[7] ............................. F28F 27/00; F28F 11/00
(52) U.S. Cl. ...................... 165/200; 165/11.1; 165/41; 165/70; 165/101; 165/282; 165/294; 165/295; 23/40; 23/40.5 R
(58) Field of Search .................................. 165/200, 295, 165/282, 294, 70, 101, 11.1, 41; 73/40, 40.5 R (56) References Cited

U.S. PATENT DOCUMENTS 4,738,304 A * 4/1988 Chadmeirs ................. 165/11.1
5,226,471 A * 7/1993 Stefani ......................... 165/70

FOREIGN PATENT DOCUMENTS

GB 572889 * 10/1945 ................... 165/70

* cited by examiner

Primary Examiner—John K. Ford
(74) Attorney, Agent, or Firm—W. H. Meise; S. D. Weinstein (57) ABSTRACT

A plurality of autonomously controlled valves in a fluid distribution system are interconnected by a data communication network. The system also includes fluid flow sensors which report to the system by way of the network. The autonomous controllers include information as to their neighbors or environment sufficient to determine malfunctions such as a leak or break in an associated path, and can take autonomous action. The actions are established by the autonomous controllers regardless of the existence of a connection to the network, so that even if the network connection fails or is damaged, the valve can still respond to its own flow sensor with predetermined actions.

2 Claims, 5 Drawing Sheets

FLUID CONTROL SYSTEM WITH AUTONOMOUSLY CONTROLLED VALVES

FIELD OF THE INVENTION

This invention relates to distributed control of fluid flow paths in contexts in which the flow paths, the equipments coupled to the flow paths, or both may fail or be damaged.

BACKGROUND OF THE INVENTION

Seagoing vessels, regardless of whether they are intended for sport, commerce, or warfare, share in common the need to maintain their buoyancy and control in the face of potentially violent conditions including storms, grounding, andor hostile action. Maintaining control and buoyancy in the face of damage due to such violent conditions may require rapid amelioration of, or adaptation to, such damage. In a large ship, there may be many compartments, the entrances to which are separated by a sufficient distance from each other so that considerable time may be required for movement from one compartment to another. The existence of such compartments has in the past given rise to the need for an observer assigned to each compartment or set of compartments to monitor conditions. It might be thought that speaker tubes or telephones would be suitable for communicating between each of the various compartments and a control center or bridge, but there is a real possibility that damage to a compartment might also damage the communications equipment. Consequently, warships assign crew members to be messengers, whose duty is to carry information from the compartments to the control center or bridge in the event of a break in the communications. Since damage to one compartment of a ship may require adjustments, in many compartments, as for example when flooding of a compartment requires redistribution of the ship's load or supplies to prevent excessive list. The adjustments may include operation of valves and switches within the compartments, as might be required, for example, to start pumps and open valves for the dumping overboard of bilge water, or for redistributing liquid fuel from tanks on one side of the ship to tanks on the other side. Because time is very important when attempting to cope with damage, warships have in the past stationed crews at various locations about the ship. These crews are charged with the duties of operating valves and switches as commanded or trained. In addition to such adjustments, additional crews must be provided to be on standby for firefighting, for damage repair, and for tending the injured. In the case of a warship, a portion of the crew must additionally be used for manning weapons and countermeasure. Since the tending of injured presupposes that some of the crew is not capable of performing its duties, the crew must, even when reduced in number by casualties, be large enough to be able to perform all of the tasks associated with tending a ship in distress. All of these considerations result in the manning of ships with crews large enough to provide "surge" capability for the handling of any emergency. A large battleship of WWII vintage had a crew in excess of 3000 men, and an aircraft carrier in the vicinity of 5000. Even modern missile destroyers require crews exceeding 300.

The presence of such large crews inevitably has its effects on ship design. It will be clear that the housekeeping and support requirements tend to expand disproportionally as the crew grows larger. The ship itself must be large in order to hold the oversize crew, and must carry additional stores such as food, which makes it larger still. Food preparation areas must be larger with a large crew, and the additional food preparation personnel in turn require their own support staff and ship facilities. The cost of ships is adversely affected by the need for a crew of a size to provide surge capability, and the cost of operating such ships is directly increased by the supernumerary members of the crew. The operating cost is further increased by the need to maintain the supernumerary members. It is thus of great importance in ship design to take into account the staffing requirements of the ship, and to improve ship design in such a manner as to minimize the crew size.

SUMMARY OF THE INVENTION

A part of the invention is based, in part, on the realization that automation can fulfil some of the tasks now performed by supernumerary crew members.

A circulating fluid system according to an aspect of the invention tends to cause fluid flow through at least one fluid-using or fluid-affecting device, such as a heat exchanger of a set of heat exchangers in the described examples. In such a system, any heat exchanger of the set may fail. The system includes a plurality of heat exchangers, each including a first port and a second port connected by a path for the flow of the fluid between the first and second ports. A first fluid path extends from a first fluid bifurcation to the first port of a first heat exchanger of the set of heat exchangers. The first fluid path includes a first software-controllable valve and a first flow sensor. The system also includes a second fluid path extending from the first bifurcation to the first port of a second heat exchanger of the set of heat exchangers. The second fluid path includes a second software-controllable valve and a second flow sensor. The system also includes a third fluid path extending from the first port of the first heat exchanger to the first port of the second heat exchanger. The third fluid path includes a third software-controllable valve and a third flow sensor. A fluid sink is coupled to a second bifurcation. A fourth flow sensor lies in a fourth fluid flow path extending from the second port of the first heat exchanger to the second bifurcation. A fifth flow sensor lies in a fifth fluid flow path extending from the second port of the second heat exchanger to the second bifurcation. A sixth fluid flow path couples the first bifurcation to a source of pressurized fluid. A communication network interconnects the flow meters and valves for providing a path for the flow of information relating to the state of each valve and the flow rate sensed by each flow sensor. An independent first program (which may be either firmware or software) is associated with the first valve. The first program is preloaded with information about the third and fourth fluid flow paths, for receiving from the network current fluid flow information associated with at least the third and fourth flow sensors, for, in at least one mode of operation, summing the flows associated with the third and fourth fluid flow paths to thereby form a first summed fluid flow, and for comparing the first summed fluid flow with the flow through the first flow sensor, and for closing the first valve, for thereby closing off the first fluid flow path when the first summed flow is not equal to the flow through the first flow sensor. An independent second software program is associated with the second valve. The second software program is preloaded with information about the third and fifth fluid flow paths, for receiving from the network current fluid flow information associated with at least the third and fifth flow sensors, for summing the flows associated with the third and fifth flow paths to form a second summed fluid flow, and for comparing the second summed fluid flow with the flow through the second flow sensor, and for closing the second valve for closing off the second flow path when the second summed flow is not equal to the flow through the second flow sensor.

DESCRIPTION OF THE INVENTION

Figure 1:
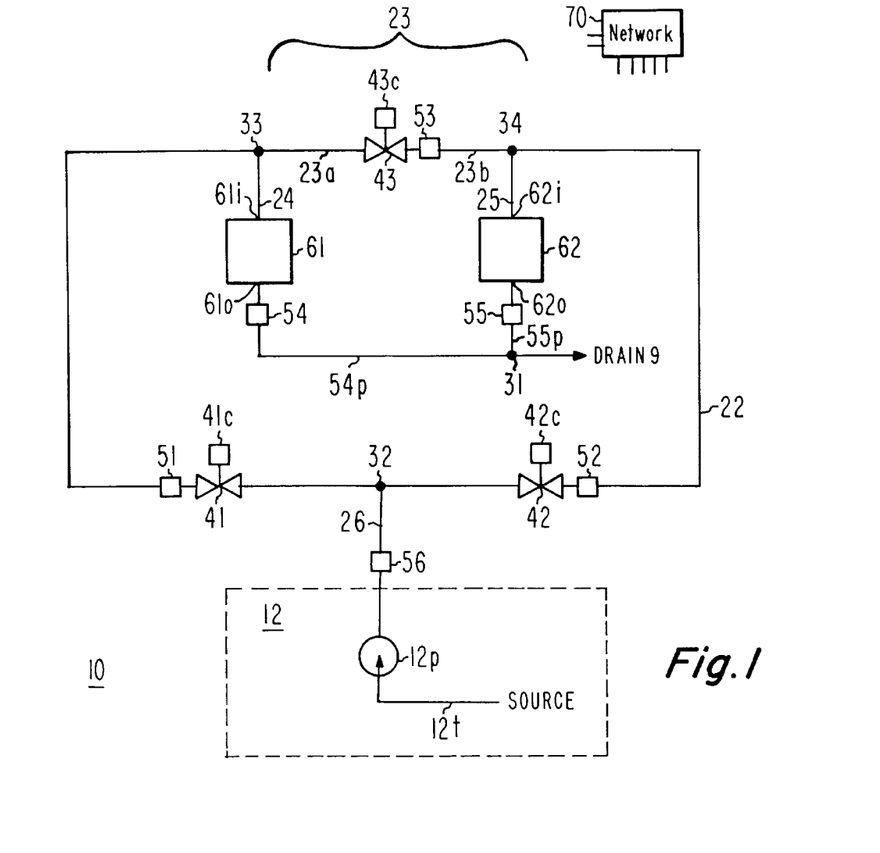
FIG. 1 is a simplified block diagram of a fluid flow or distribution system for distributing fluid from a source to one or both of a pair of flow utilization devices.

In FIG. 1, a flow system 10 includes a source 12 of pressurized fluid, such as water. As illustrated, source 12 may include a pump 12$p$ coupled to a source of water, which may be a tube 12$t$ extending through the hull of a ship so as to allow pump 12$p$ to draw salt water from the ocean. Pump 12$p$ provides pressurized fluid through a fluid flow sensor 56 to a pipe tee or bifurcation 32, which provides pressurized fluid to a flow path or pipe 21 by way of a software-controlled valve 41 and a flow sensor 51. Software-controlled valve 41 is controlled by an independent program associated with a valve controller 41$c$. Bifurcation 32 also provides pressurized fluid to a second flow path 22 by way of a software-controlled valve 42 and a flow sensor 52. Software-controlled valve 42 is controlled by an independent program associated with a valve controller 42$c$. When valve 41 is open (allows flow of fluid) and pump 12$p$ is in operation, pressurized fluid is coupled to a tee junction or bifurcation 33, and fluid flows from heat exchanger input port 61$i$ through heat exchanger 61 to a heat exchanger output port 61$o$, through a flow sensor 54 to a further tee junction or bifurcation 31, and to a drain designated 9. When valve 42 is open and pump 12$p$ is in operation, pressurized fluid is coupled to a tee junction or bifurcation 34, and as a result fluid flows from an input port 62$i$, through a heat exchanger 62 to an output port 62$o$, through a flow sensor 55, to a tee junction or bifurcation 31, and to drain 9.

While the flow meters of FIG. 1 are illustrated as being separate from the controllable valves, they may be physically integrated into the same device or housing, and use common power supplies, logic hardware, and network connections.

The controllable valves 41, 42, and 43 of FIG. 1 may be located in a ship and connected for the flow of fluid in a manner described in more detail in U.S. patent application Ser. No. 09/571,346 filed on May 16, 2000 in the name of Hoyle et al now U.S. Pat. No. 6,240,867. The controllable valves may be of any kind, but are preferably the type described in U.S. patent application Ser. No. 09/375,695 filed on Aug. 17, 1999 in the name of Hoyle et al. The flow sensors may be of any kind, but are preferably the unidirectional-flow-sensing type described in U.S. patent application Ser. No. 09/349,576 filed on Jul. 8, 1999 in the name of Hoyle et al., or of the bidirectional type described in U.S. patent application Ser. No. 09/487,848 filed Jan. 19, 2000 in the name of Hoyle et al.

The arrangement 10 of FIG. 1 also includes a further flow path 23 coupled between tee junctions 33 and 34. Flow path 23 includes flow paths 23$a$ and 23$b$, a flow sensor 53, and also includes a software-controlled valve 43 controlled by a controller 43$c$.

In FIG. 1, a communication network, illustrated as a block 70, couples valve controllers 41$c$, 42$c$, and 43$c$ with flow sensors 51, 52, 53, 54, 55, and 56. Each valve controller 41$c$, 42$c$, and 43$c$ is associated with, or contains, an independent logic system, which may be in the form of dedicated hardware, or preferably software, which acts, in conjunction with the communication network 70, as a distributed control system for controlling the fluid flow system 10 under a variety of conditions. The advantage of a distributed control system is that it is robust, with any undamaged subportion of the system 10 continuing to operate properly notwithstanding damage to, or failure of, other portions of the system 10. Thus, undamaged portions of the distributed control system continue to function notwithstanding damage to a portion of the overall control system, much as the uninjured members of a crew can continue to perform their duties notwithstanding incapacity of some crew members.

Figure 2:
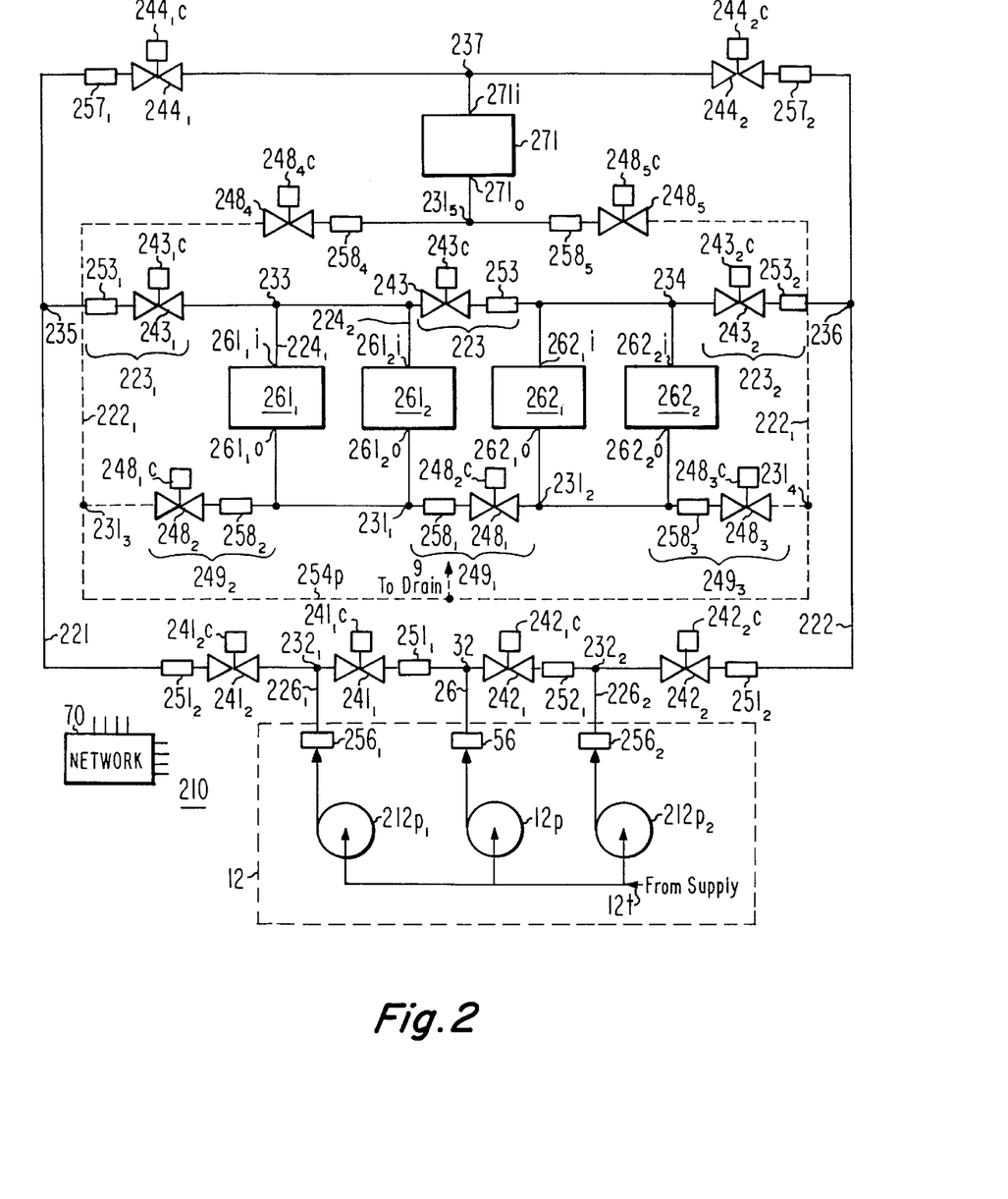
FIG. 2 is a simplified block diagram of a fluid flow or distribution system for distributing fluid from a plurality of sources to a plurality of flow utilization devices.

FIG. 2 is a simplified block diagram of a fluid distribution system 210 more complex than, but generally similar in effect, to the arrangement 10 of FIG. 1. In FIG. 2, source 12 of pressurized fluid includes a fluid supply tube 12$t$ which supplies fluid to three pumps 12$p$, 212$p_1$, and 212$p_2$. When in operation, each pump 12$p$, 212$p_1$, and 212$p_2$ produces pressurized fluid at an associated tee junction or bifurcation 32, 232$_1$, and 232$_2$. A flow sensor 56 measures the fluid flow through pump 12$p$, a flow sensor 256$_1$, measures the fluid flow through pump 212$p_1$, and a flow sensor 256$_2$ measures the fluid flow through pump 212$p_2$. A software-controlled valve 241$_1$ with a controller 241$_1c$ is serially coupled with a flow sensor 251$_1$ to provide a path for the flow of fluid between tees or bifurcations 32 and 232$_1$. Similarly, a software-controlled valve 241$_2$ with a controller 241$_2c$ is serially coupled with a flow sensor 252$_1$ to provide a path for the flow of fluid between tee or bifurcation 232$_1$ and flow path 221. A software-controlled valve 242$_1$ with a controller 242$_1c$ is serially coupled with a flow sensor 252$_1$ to provide a path for the flow of fluid between tees or bifurcations 32 and 232$_2$. A software-controlled valve 242$_2$ with a controller 242$_2c$ is serially coupled with a flow sensor 251$_2$ to provide a path for the flow of fluid between tee or bifurcation 232$_2$ and fluid path or pipe 222. Thus, triply-redundant pumps 12$p$, 212$p_1$, and 212$p_2$, when energized, provide pressurized fluid to tees or bifurcations 32, 232$_1$, andor 232$_2$, and, depending upon the states of the valves, the pressurized fluid may be supplied to path 221, 222, or both 221 and 222.

In FIG. 2, a pair of heat exchangers 261$_1$ and 261$_2$ are operated in parallel by having their input ports 261$_1i$ and 261$_2i$ coupled to tee or bifurcation 233 by way of fluid flow paths 224$_1$ and 224$_2$, respectively, and by having their output ports 261$_1o$ and 261$_2o$ coupled to tee or bifurcation 231$_1$. Similarly, a pair of heat exchangers 262$_1$ and 262$_2$ are operated in parallel by having their input ports 262$_1i$ and 262$_2i$, respectively, coupled to tee or bifurcation 234, and by having their output ports 262$_1o$ and 262$_2o$, respectively, coupled to tee or bifurcation 231$_2$. Heat exchanger sets 261$_1$, 261$_2$ and 262$_1$, 262$_2$ are connected to fluid source pipes 221 and 222 by means of software-controlled valves: a software-controlled valve 243, which is controlled by a controller 243$c$, is serially coupled with a flow sensor 253 in a path 223 extending from tee or bifurcation 233 to tee or bifurcation 234, a software-controlled valve $243_1$, which is controlled by a controller $243_1c$, is serially coupled with a flow sensor $253_1$ in a path $223_1$ extending from tee or bifurcation 233 to tee or bifurcation 235, and a software-controlled valve $243_2$, which is controlled by a controller $243_2c$, is serially coupled with a flow sensor $253_2$ in a path $223_2$ extending from tee or bifurcation 234 to tee or bifurcation 236. Heat exchanger sets $261_1$, $261_2$ and $262_1$, $262_2$ are connected to fluid drain pipes $221_1$ and $222_1$ by means of software-controlled valves: a software-controlled valve $248_1$, which is controlled by a controller $248_1c$, is serially coupled with a flow sensor $258_1$ in a path $249_1$ extending from tee or bifurcation $231_1$ to tee or bifurcation $231_2$, a software-controlled valve $248_2$, which is controlled by a controller $248_2c$, is serially coupled with a flow sensor $258_2$ in a path $249_2$ extending from tee or bifurcation $231_1$, to tee or bifurcation $231_3$, and a software-controlled valve $248_3$, which is controlled by a controller $248_3c$, is serially coupled with a flow sensor $258_3$ in a path $249_3$ extending from tee or bifurcation $231_2$ to tee or bifurcation $231_4$.

Also in FIG. 2, a further heat exchanger 271 has a (nominally input) port 271i connected for the flow of fluid to a tee or bifurcation 237, and also has a (nominally output) port 271o connected to a tee or bifurcation $231_5$. Bifurcation 237 is coupled to source fluid paths 221 and 222 by way of software-controlled valves $244_1$, (controlled by controller $244_1c$) and $244_2$ (controlled by controller $244_2c$). Valves $244_1$ and $244_2$ are serially coupled with flow sensors $257_1$ and $257_2$, respectively. Heat exchanger 271 has its (nominally) output port 271o and tee or bifurcation $231_5$ coupled to source drain paths $221_1$ and $222_1$ by way of software-controlled valves $248_4$ (controlled by controller $248_4c$) and $248_5$ (controlled by controller $248_5c$). Valves $248_4$ and $248_5$ are serially coupled with flow sensors $258_4$ and $258_5$, respectively.

In operation of the arrangement of FIG. 2, either or both of fluid source paths 221 or 222 can be pressurized by operation of any one of the pumps $12p$, $212p_1$, and/or $212p_2$, by operating valves $241_1$, $241_2$, $242_1$, and $242_2$ to an appropriate position. For example, pump $12p$ can pressurize path 221 by opening valves $241_1$ and $241_2$, while path 222 can additionally be pressurized by opening valves $242_1$ and $242_2$. If, on the other hand, only pump $212p_1$ is energized, path 221 can be pressurized by opening only valve $241_2$, while path 222 can additionally be pressurized by opening valves $241_1$, $242_1$ and $242_2$. With source pipes 221 and 222 pressurized by operation of pump $212p_1$, pipe 221 can be "depressurized" by closing valve $241_2$, assuming that no other path provides pressurization. Other combinations of open (flow allowed) and closed (flow prevented) conditions of various ones of valves $241_1$, $241_2$, $242_1$, and $242_2$ allow any or all of the pumps $12p$, $212p_1$, and/or $212p_2$ to pressurize either or both of paths 221 and 222.

Bifurcation 235 of FIG. 2 allows fluid pressure in path 221 to be communicated to valves $243_1$ and $244_1$, while bifurcation 236 allows fluid pressure in path 222 to be communicated to valves $243_2$ and $244_2$. Opening any one of these valves allows fluid under pressure to be applied to the input port of at least one of the heat exchangers. More particularly, if path 221 is pressurized, opening valve $243_1$ allows pressurized fluid to reach the input ports $261_1i$ and $261_2i$ of heat exchanger set $261_1$ and $261_2$, and opening valve $244_1$ allows pressurized fluid to reach the input port 271i of heat exchanger 271. If path 222 is pressurized, opening valve $243_2$ allows pressurized fluid to reach the input ports $262_1i$ and $262_2i$ of heat exchanger set $262_1$ and $262_2$, and opening valve $244_2$ allows pressurized fluid to reach the input port 271i of heat exchanger 271. Thus, pressurized fluid can reach the input port 271i of heat exchanger 271 by way of either valve $244_1$ or $244_2$, or by way of both if both valves are in the open state.

Just as pressurized fluid may be coupled to the input port 271i of heat exchanger 271 by either or both of two paths including paths 221 and 222, pressurized fluid may be coupled by either or both of two paths, including paths 221 and 222, to the input ports $261_1i$, $261_2i$, $262_1i$, $262_2i$ of heat exchangers $261_1$, $261_2$, $262_1$, and $262_2$, by opening valve 243 in conjunction with the opening of at least one of valves $243_1$ and $243_2$.

Unlike the arrangement of FIG. 1, the arrangement of FIG. 2 includes valves in the drain paths. Valves in the drain paths may be desirable to prevent backflow and to allow maintenance on or replacement of particular units. The main drain paths are designated $221_1$ and $222_1$ in FIG. 2. Drain paths $221_1$ and $222_1$ join at a tee or bifurcation 31, and the common port of the tee is coupled to drain 9. Fluid having passed through heat exchanger 271 exits by way of port 271o and arrives at tee or bifurcation $231_5$. If valve $248_4$ is open, the fluid from output port 271o flows from tee or bifurcation $231_5$ to drain path $221_1$ and thence to drain 9. On the other hand, if valve $248_5$ is open, the fluid from output port 271o flows from tee or bifurcation $231_5$ to drain path $222_1$ and thence to drain 9. If both valves $248_4$ and $248_5$ are open, fluid can flow from drain port 271o to drain 9 by way of two paths. Similarly, there are multiple paths for the flow of fluid from the drain ports $261_1o$, $261_2o$, $262_1o$, $262_2o$ of heat exchangers $261_1$, $261_2$, $262_1$, and $262_2$, respectively, to drain 9. Opening valve $248_2$ allows drain fluid to flow from tee or bifurcation $231_1$ to drain 9 by way of path $221_1$, and opening valve $248_3$ allows drain fluid to flow from tee or bifurcation $231_2$ to drain 9 by way of path $222_1$. Opening valve $248_1$ allows drain fluid to flow between tees or bifurcations $231_1$ and $231_2$, thus allowing drain fluid from heat exchanger drain ports $261_1o$, $261_2o$, $262_1o$, $262_2o$ of heat exchangers $261_1$, $261_2$, $262_1$, and $262_2$, respectively, to flow by that one of paths $221_1$ or $222_1$, or both, as permitted by the states of valves $248_2$ and $248_3$. As in the case of the arrangement of FIG. 1, a network 70 interconnects the various valve controllers and flow valves so that information relating to the valve states and flow rates to be received by each of the valve controllers.

Figure 3:
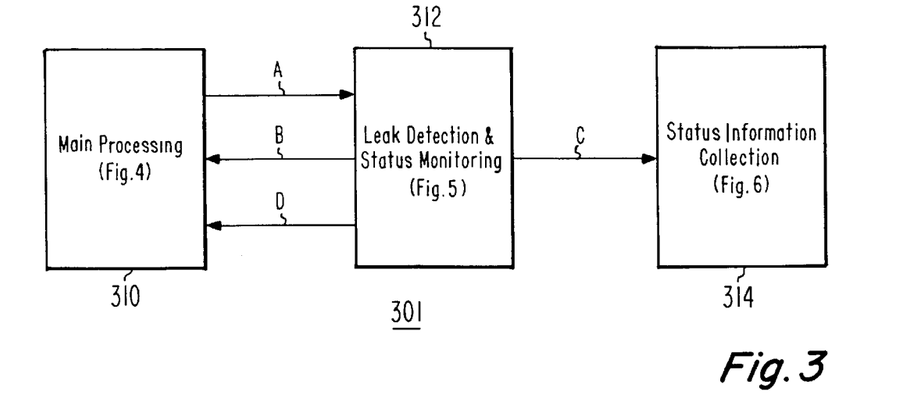
FIG. 3 is a simplified block representation of various software or logic portions which are associated with each valve of the arrangement of FIG. 1 or 2 for autonomously controlling the valve.

FIG. 3 is a highly simplified block diagram representing a portion 301 of the software which resides at, or is associated with, each valve controller of the arrangements of FIGS. 1 and 2. In addition to the illustrated software, each valve will have resident or associated equipment and software (not illustrated) for communicating over the network 70 of FIGS. 1 and 2, and valve operating equipment (not illustrated) for actually controlling the state of the fluid valve. The valve operating equipment may include electrically, pneumatically, andor hydraulically-powered motors or drivers. Some valves might even be powered by stored mechanical energy, as for example by a wind-up spring or a weight-and-pulley arrangement.

Software block 310 of software 301 of FIG. 3 represents the main processing flow for determining or commanding the state of the associated valve. Block 310 receives information from an ancillary processing block 312 by way of paths designated B and D. Block 310 produces commands which proceed by way of a path designated A to a leak detection and status monitoring block 312. Block 314 represents a logic arrangement for collecting status information from flow meters, pressure sensors and valve state establishing the times at which various calculations are performed. The timing of the calculations is important, because the information on which the calculations are based may have been sensed at different times, thereby tending to reduce the relationship among different quantities. For example, if the flow through a flow sensor of FIG. 1 is measured or sensed to be zero at time t1, and the pressure in the associated pipe is measured to be low at a later time, calculation may lead to the erroneous conclusion that the pump is not pumping hard enough, when simultaneous measurements might reveal that the pipe pressure is low, but also that there is a large fluid flow through the sensor. Such a condition might lead to a correct conclusion (for some situations) that there is a break in the pipe downstream from the sensor. The timing provided by block 314 of FIG. 3 aligns the measurement times so the calculations are meaningful.

Figure 4:
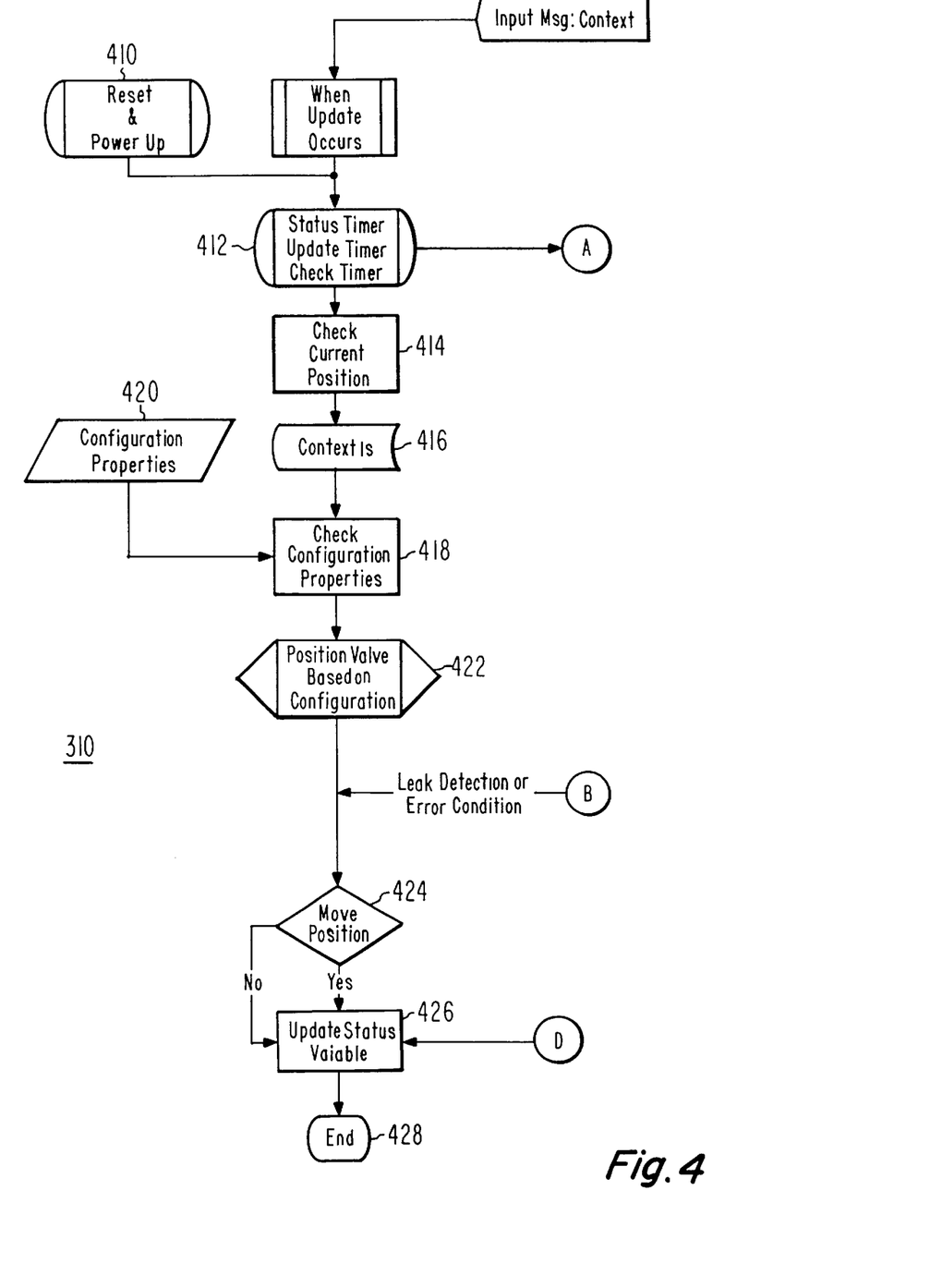
FIG. 4 is a simplified block representation of a logic flow chart or diagram of a portion of FIG. 3.

FIG. 4 is a simplified flow chart or diagram illustrating the main logic sequence of block 310 of FIG. 3. In FIG. 4, the logic can be viewed as starting at a block 410, representing power-up or reset. The logic traverses various logic paths continuously in normal operation. From block 410, the logic flows to a block 412, which represents resetting of the system timers. The default values of the software are used to set the correct initial position of the valve. With the system timers reset, the logic branches over path or node A to leak detection and status monitoring block 312 of FIG. 3. From block 412, the logic flows to a block 414, which represents determination of the current state or position of the associated valve as being nominally open (fluid flow permitted), closed (no fluid flow) or (in some embodiments) at positions between open and closed. From block 414, the logic of FIG. 4 flows to a block 416. Block 416 receives information relating to the system context from network 70 of FIGS. 1 and 2. The system context information tells the valve the conditions under which the ship is operating, which may include such conditions as "docked," "normal," and "battle." This is merely a memory store which stores information from a remote source for use by the logic flow. From block 416, the logic flows to block 418, which combines the information from block 416 with information telling the valve "where it is" in the context of the system, so that the autonomous logic of FIG. 4 for each valve can interact, by way of the network, with sensors and with other valves of the system in a quasi-intelligent manner to achieve the desired result. The system configuration information is maintained in a memory designated 420. The system configuration information is a setting for each valve which describes it in functional terms, such as a "root" valve, which allows flow or a cross-connect valve, which allows selection from among multiple paths. In general, the location or system configuration information contained in block 420 does not change from time to time, as the valve ordinarily stays in the same location in the same plumbing system. The only situations in which the memorized configuration information might be changed include in conjunction with reconfiguration of the plumbing system or removal of a valve (with its software) to another location in the same or a different plumbing system.

From block 418 of FIG. 4, the logic flows to a driver block 422, which represents the setting of the associated valve to the position determined in block 418.

From block 422 of FIG. 4, the logic proceeds to a decision block 424. Block 424 responds to the command from driver block 422 or to the leak- or error-condition command from node B, generated in the logic flow of FIG. 5. Block 424 of FIG. 4 compares the commanded state of the valve with the current valve position. If no change in the position of the valve is required in order to meet the commanded position, the logic leaves decision block 424 by the NO output, and arrives at a block 426. If a change in position of the valve is required, the logic leaves decision block 424 by the YES output and effects the position change, and the logic then arrives at block 426. Block 424 must resolve conflicting valve state commands in some cases. For example, if the normal configuration command is produced by block 422 and a "close valve" command is received by way of node B, block 424 uses logic which may be dependent upon the configuration properties to resolve the conflict. Ordinarily, the emergency-condition command arriving by way of node B will override the normal-mode commands from block 422.

Block 426 of FIG. 4 updates the valve-position variable, and makes it available to other controllable valves of the system by way of the interconnecting network 70 of FIGS. 1 and 2. From block 426, the logic flows to an END or Pause block 428, in which the logic resides until the next logic cycle is initiated.

Figure 5:
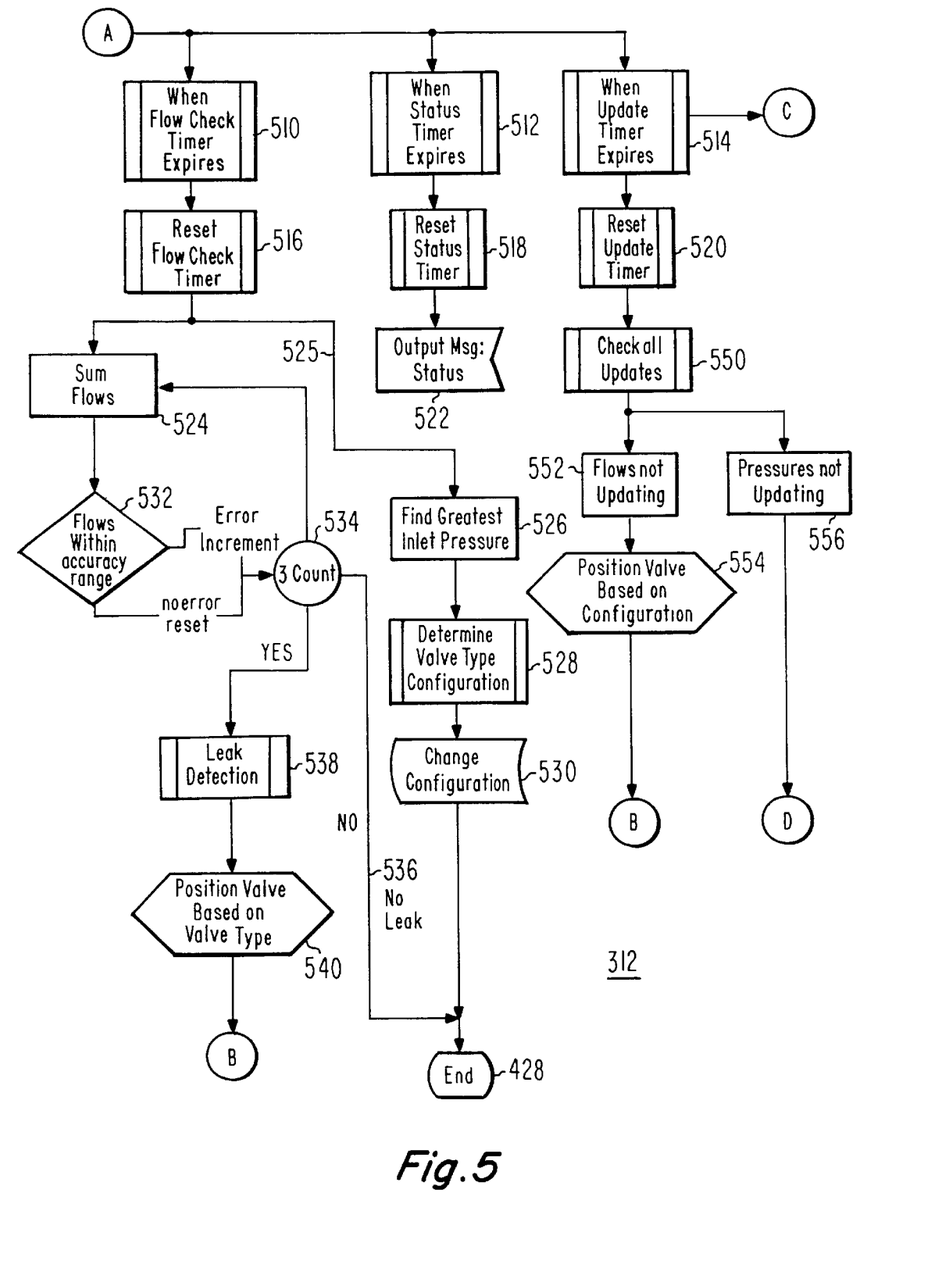
FIG. 5 is a simplified block representation of a logic flow chart or diagram of another portion of FIG. 3.

FIG. 5 is a simplified representation of the logic of block 312 of FIG. 3. In FIG. 5, the logic includes a plurality of timers which recurrently count down from some preset time, as for example 30 seconds. In FIG. 5, block 510 is a flow check timer, block 512 is a status reporting timer, and block 514 is a loss-of-communication timer which seeks input from the inter-valve network, and which deems the interconnection to the valve with which it is associated to be broken if no input is received within a particular interval. Each of flow check timer 510, status reporting timer 512, and loss-of-communication timer 514 is connected to a timer reset block 516, 518, and 520, respectively. These timer reset blocks cause the associated counters to reset to their starting values upon occurrence of a complete count. Status reporting timer reset block 518 is connected to a block 522, which represents the sending or reporting from the associated controllable valve to the interconnection system 70 (FIGS. 1 and 2) of the current status or state of the valve, and of the flow through any associated flow meter. The reporting of such information from the associated valve to the network 70 is thus under the control of timer 512.

From timer reset block 516 of FIG. 5, the logic flows to a block 524 and by way of a path 525 to a block 526. Block 526 is the first block in a logic which determines flow direction through the associated valve. If the associated flow meter happens to be bidirectional, then the determination of the logic flow beginning at block 526 can be simplified to a mere decision block. If the associated flow meter is not bidirectional, block 526 represents determination of the relative pressures on each side of the associated valve, and determination of that one of the pressures which is greatest. Block 528 represents selection of the system configuration used in the associated valve based upon the flow direction. This is an either/or determination. From block 528, the logic flows to a block 530, which represents selecting the system configuration, selected from among the configurations stored in block 420 of FIG. 4. From block 530, the logic flows to end or pause block 428.

From timer reset block 516 of FIG. 5, the logic flow to block 524 begins leak or broken-pipe detection for the associated valve. Block 524 sums the fluid flows in the nearest neighbor of the system configuration stored in block 530 of FIG. 5. For example, if the associated valve of the logic of FIGS. 4 and 5 happens to be valve $244_2$ of FIG. 2, then the configuration information or table stored in block 530 includes information to the effect that the input fluid flow of the associated valve $244_2$ equals the fluid flow through valve $241_2$, and the output fluid flow equals the sum of the fluid flows through valves $244_1$, $248_4$, and $248_5$. The assumption is made that the fluid flow through any valve is the same as that of the associated flow sensor, regardless of whether the flow sensor is integrated with the valve or whether it is a separate item located near the valve. Block 524 of FIG. 5 sums the flows, and the resulting sum should be in balance. The sum information from block 524 is evaluated by a decision block 532, which compares the imbalance with a tolerance which is determined by the tolerances in the flow measuring devices. Only those out-of-balance conditions which exceed the tolerances are deemed to be important. Since there may be transient imbalances, no single imbalance measurement is relied upon, but a sequence of plural imbalances are the criterion for declaring a leak or a break. For this purpose, the significant error conditions flowing from the ERROR output of block 532 are applied to an INCREMENT input port of an error counter 534, which increments. If decision block 532 detects a non-error condition during a clock cycle, the error counter 534 is reset to zero by a signal applied to the RESET input port. So long as a particular number of consecutive error conditions do not occur, error counter 534 produces no output on NO-LEAK logic path 536, and the logic flows to END or PAUSE block 428. Upon the occurrence of the selected number of errors, counter 534 produces a leak error signal and applies it to a block 538, which declares a leak. Block 540 represents the setting of the position of the associated valve to the position established by the configuration information for a leak condition. Most valves would be set to the closed state in the event of a leak, but there may be unusual circumstances in which the valve is not closed, but the leak is reported. From block 540, the logic flows to logic node B.

From update timer reset block 520 of FIG. 5, the logic flows to a block 550, which represents the determination of the existence of update signals from the neighbors during the update interval. Thus, if the associated valve is valve $244_2$, and its neighbors are $242_2$, $244_1$, $248_4$, and $248_5$, block 550 determines that signals have arrived from these four neighbors. Block 552 determines if the fluid flow information is not being updated, and generates logic signals which are passed to a block 554. Block 554 represents the setting of the associated valve to the position based on the configuration (which depends upon the operating mode). From block 554, the logic flows to node B, which returns to block 424 of FIG. 4. If pressure information from the neighbors is not being updated, block 556 responds, and the logic flows back to block 426 of FIG. 4 by way of node D.

Figure 6:
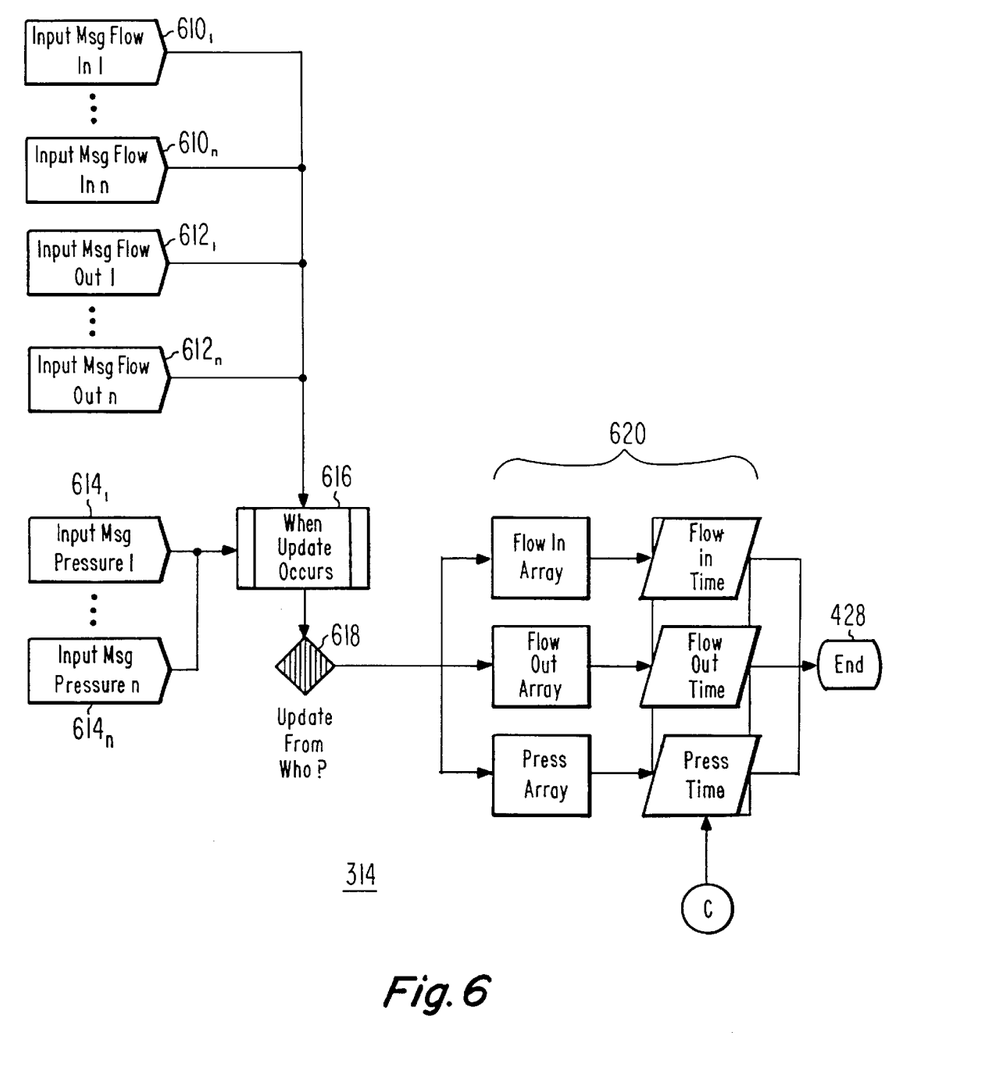
FIG. 6 is a simplified block representation of a logic flow chart or diagram of another portion of FIG. 3.

Status information collection block 314 of FIG. 6 collects information which arrives from mutually unsynchronized controllable valves. The information is captured, and temporarily stored in memory until it is needed by other portions of the logic. In FIG. 6, blocks $610_1 \ldots 610_n$ represent input messages occurring at different times, arriving by way of the network from neighbor flow meters associated with flow paths which provide fluid flow to the associated valve, blocks $612_1 \ldots 612_n$ represent input messages occurring at different times, arriving by way of the network from neighbor flow meters associated with output fluid flows, and blocks $614_1 \ldots 614_n$ represent messages occurring at different times, arriving by way of the network from neighbor pressure meters. All of the messages arrive at a block 616, which represents storage of the messages at the times at which they arrive, together with a message header indicating the source of the information and the time of arrival. Block 618 distributes the information to the appropriate locations in an array 620 which facilitates processing for leak detection. Array 620 includes locations for each element of flow-in information, together with time of arrival, locations for each element of flow-out information, together with time of arrival, and locations for each element of pressure information, together with time of arrival. The array information is made available to other portions of the logic, under command by way of node C from the update timer 514 of FIG. 5. From the array 620 of FIG. 6, the logic flows to END or PAUSE block 428.

An embodiment of a system of independently-or autonomously- controllable valves substantially in accordance with the above description was produced and tested in conjunction with flow systems more complex than those of FIGS. 1 and 2, and was found to operate satisfactorily. One insight which was derived experimentally was that a flow sensor is desirably associated with each of the controllable valves. It was found that systems containing fewer flow determinations than valves were difficult to stabilize under some conditions. It is believed that the use of more accurate flow sensors might allow adequate system stability with fewer flow sensors than controllable valves.

Other embodiments of the invention will be apparent to those skilled in the art. For example, the valves need not be in the same housings as the flow meters, or may be in the same housings. The pressure meters may or may not be used, as desired. Various types of interconnecting networks may be used, including twisted-pair, cable, optical fiber, or even wireless. The particular implementation of the experimental units used copper twisted-pair wires running the LonWorks protocol. The particular logic processors were Neuron processors, a technology of Echelon Corporation of Palo Alto, Calif., but other processors may be used. While in the described embodiments the fluid affecting devices are heat exchangers, they could be chemical reaction devices, so long as the flow rates of the reactants and the reaction products are known and accounted for.

Thus, an aspect of the invention lies in a plurality of autonomously controlled valves in a fluid distribution system, interconnected by a data communication network. The system also includes fluid flow sensors which report to the system by way of the network. The autonomous controllers include information as to their neighbors or environment sufficient to determine malfunctions such as a leak or break in an associated path, and can take autonomous action. The actions are established by the autonomous controllers regardless of the existence of a connection to the network, so that even if the network connection fails or is damaged, the valve can still respond to its own flow sensor with predetermined actions. The fluid distribution system may be for causing the flow of fluid through any kind of fluid affecting devices, and in the example the devices are heat exchangers.

More particularly, a circulating fluid system (10;210) according to an aspect of the invention tends to cause fluid flow through at least one device (heat exchanger in the following example, or any other type of fluid affecting device such as a valve, pipe, flowsensor, bifurcation, or the like) of a set (61, 62; $261_1$, $261_2$, $262_1$, $262_2$, 271) of heat exchangers. In such a system, any heat exchanger of the set (61, 62; $261_1$, $261_2$, $262_1$, $262_2$, 271) may fail. The system (10; 210) includes a plurality (at least two) of heat exchangers (such as 61, 62 of system 10), each including a first (suffix i) port and a second (suffix o) port connected by a path for the flow of the fluid between the first and second ports. A first fluid path (21, 41, 51, 24; $251_1$, $241_1$, $241_2$, $251_2$, 221, $253_1$, $243_1$, $224_1$) extends from a first fluid bifurcation (32; 32) to the first port (61i, for example) of a first heat exchanger (61 in the example) of the set (61, 62; $261_1$, $261_2$, $262_1$, $262_2$, 271) of heat exchangers. The first fluid path (21, 41, 51, 24; $251_1$, $241_1$, $241_2$, $251_2$, 221, $253_1$, $243_1$, $224_1$) includes a first software-controllable valve (41; $241_2$) and a first flow sensor (51; $251_2$) The system (10; 210) also includes a second fluid path (42, 52, 22, 25; $242_1$, $252_1$, $241_2$, $251_2$, 222, $253_2$, $243_2$) extending from the first bifurcation (32; 32) to the first port ($262_{2i}$, for example) of a second heat exchanger ($262_2$, for example) of the set (61, 62; $261_1$, $261_2$, $262_1$, $262_2$, 271) of heat exchangers. The second fluid path (42, 52, 22, 25; $242_1$, $252_1$, $241_2$, $251_2$, 222, $253_2$, $243_2$) includes a second software-controllable valve (42; $241_2$) and a second flow sensor (52; $251_2$). The system (10; 210) also includes a third fluid path (23; 223) extending from the first port of the first heat exchanger (61; $261_1$, for example) to the first port of the second heat exchanger (62, $262_1$, for example). The third fluid path (23; 223) includes a third software-controllable valve (43, $243_2$) and a third flow sensor (53; 253). A fluid sink (9; 9) is coupled to a second bifurcation (31; 31). A fourth flow sensor (54; $258_2$) lies in a fourth fluid flow path (54p; $249_2$, 254p) extending from the second port (61o; $261_1o$) of the first heat exchanger (61; $261_1$) to the second bifurcation (31; 31). A fifth flow sensor (55; $258_3$) lies in a fifth fluid flow path (55p; $249_3$) extending from the second port (62o; $262_2o$) of the second heat exchanger (62; $262_2$) to the second bifurcation (31; 31). A sixth fluid flow path (26, 56; 26, 56) couples the first bifurcation (32; 32) to a source (12) of pressurized fluid. A communication network (70; 70) interconnects the flow meters and valves for providing a path for the flow of information relating to the state of each valve and the flow rate sensed by each flow sensor. An independent first program (301) (which may be either firmware or software) is associated with the first valve (41; $241_2$). The first program (301) is preloaded with information about the third (23; 223) and fourth (54p; $249_2$, 254p) fluid flow paths, for receiving from the network (70) current fluid flow information associated with at least the third (53; 253) and fourth (54; $248_2$) flow sensors, for, in at least one mode of operation, summing the flows associated with the third and fourth fluid flow paths to thereby form a first summed fluid flow, and for comparing the first summed fluid flow with the flow through the first flow sensor (51; $251_2$), and for closing the first valve (41; $241_2$), for thereby closing off the first fluid flow path (21, 41, 51, 24; $251_1$, $241_1$, $241_2$, $251_2$, 221, $253_1$, $243_1$, $224_1$) when the first summed flow is not equal to the flow through the first flow sensor (51; $251_2$). An independent second software program (301) is associated with the second valve (42; $241_2$). The second software program (301) is preloaded with information about the third (23; 223) and fifth (55p; $249_3$) fluid flow paths, for receiving from the network current fluid flow information associated with at least the third (53; 253) and fifth (55; $248_3$) flow sensors, for summing the flows associated with the third (23; 223) and fifth (55p; $249_3$) flow paths to form a second summed fluid flow, and for comparing the second summed fluid flow with the flow through the second flow sensor (52; $251_2$), and for closing the second valve (42; $241_2$) for closing off the second flow path (42, 52, 22, 25; $242_1$, $252_1$, $241_2$, $251_2$, 222, $253_2$, $243_2$) when the second summed flow is not equal to the flow through the second (42; $251_2$) flow sensor.

What is claimed is:

1. A circulating fluid system for tending to cause a flow of fluid through at least one fluid affecting device of a set of fluid affecting devices, where any fluid affecting device of said set of fluid affecting devices may fail, said system comprising:

a plurality of fluid affecting devices, each including a first port and a second port connected by a path for the flow of said fluid between said first and second ports;

a first fluid path extending from a first fluid bifurcation to said first port of a first fluid affecting device of said set of fluid affecting devices, said first fluid path including a first software-controllable valve and a first flow sensor;

a second fluid path extending from said first bifurcation to said first port of a second fluid affecting device of said set of fluid affecting devices, said second fluid path including a second software-controllable valve and a second flow sensor;

a third fluid path extending from said first port of said first fluid affecting device to said first port of said second fluid affecting device, said third fluid path including a third software-controllable valve and a third flow sensor;

a sink for said fluid;

a second bifurcation coupled to said sink;

a fourth flow sensor in a fourth fluid flow path extending from said second port of said first fluid affecting device to said second bifurcation;

a fifth flow sensor in a fifth fluid flow path extending from said second port of said second fluid affecting device to said second bifurcation;

a sixth fluid flow path coupling said first bifurcation to a source of pressurized fluid;

a communication network interconnecting said flow meters and valves for providing a path for the flow of information relating to the state of each valve and the flow rate sensed by each flow sensor;

an independent first software program associated with said first valve, said first software program being preloaded with information about said third and fourth fluid flow paths, for receiving from said network current fluid flow information associated with at least said third and fourth flow sensors, for summing the flows associated with said third and fourth fluid flow paths to thereby form a first summed fluid flow, and for comparing said first summed fluid flow with the flow through said first flow sensor, and for closing said first valve for closing off said first fluid flow path when said first summed flow is not equal to said flow through said first flow sensor;

an independent second software program associated with said second valve, said second software program being preloaded with information about said third and fifth fluid flow paths, for receiving from said network current fluid flow information associated with at least said third and fifth flow sensors, for summing the flows associated with said third and fifth flow paths to form a second summed fluid flow, and for comparing said second summed fluid flow with the flow through said second flow sensor, and for closing said second valve for closing off said second flow path when said second summed flow is not equal to said flow through said second flow sensor.

2. A circulating fluid system for tending to cause a flow of fluid through at least one heat exchanger of a set of heat exchangers, where any heat exchanger of said set of heat exchangers may fail, said system comprising:

a plurality of heat exchangers, each including a first port and a second port connected by a path for the flow of said fluid between said first and second ports;

a first fluid path extending from a first fluid bifurcation to said first port of a first heat exchanger of said set of heat exchangers, said first fluid path including a first software-controllable valve and a first flow sensor;

a second fluid path extending from said first bifurcation to said first port of a second heat exchanger of said set of heat exchangers, said second fluid path including a second software-controllable valve and a second flow sensor;

a third fluid path extending from said first port of said first heat exchanger to said first port of said second heat exchanger, said third fluid path including a third software-controllable valve and a third flow sensor;

a sink for said fluid;

a second bifurcation coupled to said sink;

a fourth flow sensor in a fourth fluid flow path extending from said second port of said first heat exchanger to said second bifurcation;

a fifth flow sensor in a fifth fluid flow path extending from said second port of said second heat exchanger to said second bifurcation;

a sixth fluid flow path coupling said first bifurcation to a source of pressurized fluid;

a communication network interconnecting said flow meters and valves for providing a path for the flow of information relating to the state of each valve and the flow rate sensed by each flow sensor;

an independent first software program associated with said first valve, said first software program being preloaded with information about said third and fourth fluid flow paths, for receiving from said network current fluid flow information associated with at least said third and fourth flow sensors, for summing the flows associated with said third and fourth fluid flow paths to thereby form a first summed fluid flow, and for comparing said first summed fluid flow with the flow through said first flow sensor, and for closing said first valve for closing off said first fluid flow path when said first summed flow is not equal to said flow through said first flow sensor;

an independent second software program associated with said second valve, said second software program being preloaded with information about said third and fifth fluid flow paths, for receiving from said network current fluid flow information associated with at least said third and fifth flow sensors, for summing the flows associated with said third and fifth flow paths to form a second summed fluid flow, and for comparing said second summed fluid flow with the flow through said second flow sensor, and for closing said second valve for closing off said second flow path when said second summed flow is not equal to said flow through said second flow sensor.

* * * * *